No. 845,715. PATENTED FEB. 26, 1907.
W. & G. F. MEISCHKE-SMITH.
DRIVING AND REVERSING MECHANISM.
APPLICATION FILED NOV. 12, 1904.
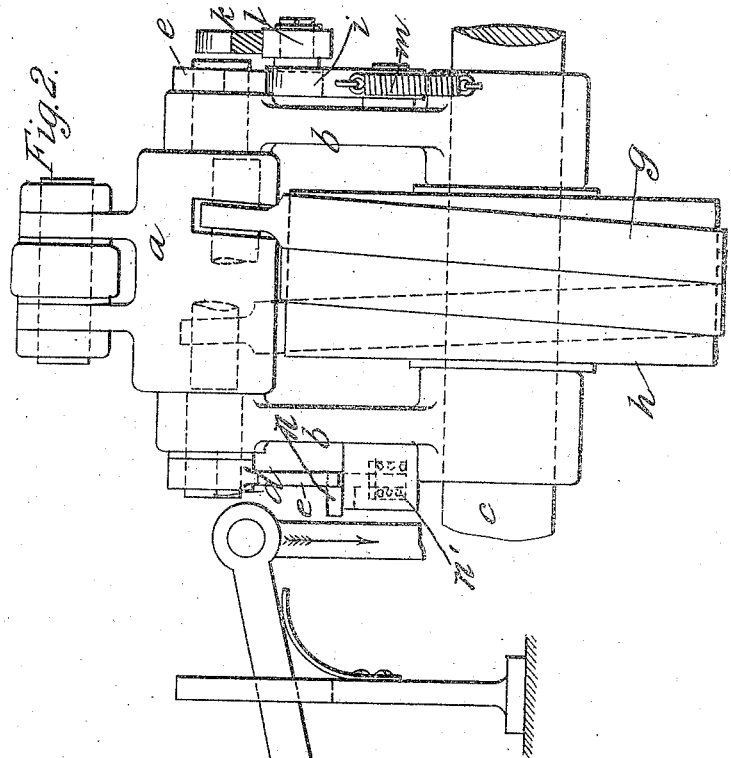
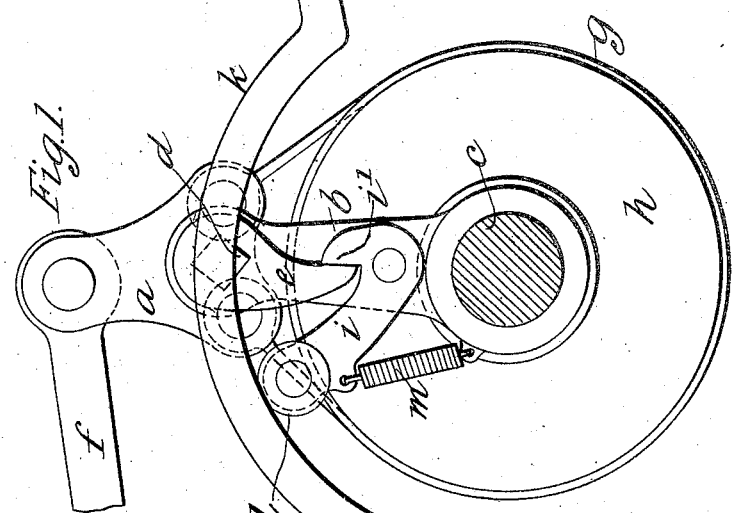

UNITED STATES PATENT OFFICE.

WILLIAM MEISCHKE-SMITH AND GEORGIUS FRANCISCUS MEISCHKE-SMITH, OF PARIS, FRANCE.

DRIVING AND REVERSING MECHANISM.

No. 845,715.    Specification of Letters Patent.    Patented Feb. 26, 1907.

Application filed November 12, 1904. Serial No. 232,502.

*To all whom it may concern:*

Be it known that we, WILLIAM MEISCHKE-SMITH, a subject of the King of Great Britain and Ireland, and GEORGIUS FRANCISCUS MEISCHKE-SMITH, a subject of the Queen of the Netherlands, both residing at 7 Rue Drouot, Paris, in the Republic of France, have invented certain new and useful Improvements in Driving and Reversing Mechanism, of which the following is a specification, for which we have applied for a patent in Great Britain, dated November 25, 1903, No. 25,776.

This invention relates to apparatus for communicating to a shaft an intermittent motion in one direction from a reciprocating motion, in which the reciprocating motion of the motor, by means of a three-armed lever, to which it is connected and which is pivotally supported between two arms loosely mounted on the shaft to be driven, tightens a band which encircles a disk keyed to the shaft. By means of a stop, which can be interposed in the path of an arm projecting from the three-armed lever, the band is prevented from tightening on the disk for one or the other of the directions of motion of the driving part, so that the disk may be driven intermittently in one or the other direction, according to the disposition of the stop.

The present invention has for its object to provide for the stoppage or to vary the speed of the driven shaft while the driving part continues to reciprocate at a constant speed. For this purpose a second stop is arranged, so that it can be interposed at will to prevent or limit the rocking motion of the three-armed lever on its pivot, and so prevent the band from being tightened on the disk for either direction of motion of the reciprocating part. By making this latter stop adjustable in the position the range of rocking motion of the three-armed lever on its pivot can be varied, and consequently the slip of the band on the disk can be varied so as to effect a variable drive with constant speed of the driving-motor.

In the accompanying drawings, Figure 1 is a diagrammatic elevation of an apparatus constructed according to this invention, and Fig. 2 shows details of the rocking block or three-armed lever and the driving-strap and disk.

The rocking block $a$ is journaled in two radial arms $b$, which are loosely mounted on the shaft $c$ to be driven. Fixed to each end of the pivot-axle $d$ of the rocking block is an arm $e$, one of which is arranged to encounter a stop $n$, which will be hereinafter referred to as the "fixed stop," although it would be generally and preferably mounted to slide radially in one of the arms $b$ and is normally urged into engagement with the arm $e$ by a spring $n'$. The fixed stop is so arranged that when at one end of the range of motion which is imparted to the block $a$ by means of a connecting-rod $f$, which is driven by a crank, (not shown in the drawing,) the rocking block $a$ is turned on its spindle, so as to loosen the grip of the brake-strap $g$ on the disk $h$, the arm $e$ encounters the fixed stop and prevents further rocking of the block, and therefore prevents the brake-strap from gripping the disk during the return movement of the connecting-rod and until the direction of motion of the block is again reversed. The other arm $e$ shown in the drawing is arranged to coöperate with a second stop, which can be secured at will at any point in its path and which acts to limit or prevent oscillation of the block $a$ in the other direction, so as to vary the grip of the disk by the brake-strap for the other direction of motion of the rocking block or to release the grip altogether, and thus keep the shaft $c$ at rest.

This stop may conveniently consist of a bent lever $i$, pivotally mounted on the second radial arm $b$ and having one of its ends $i'$ suitably formed to trip the arm $e$ when held in the path of the latter. The position at which the arm $e$ is tripped may be varied by means of a curved lever $k$, pivoted to a fixed part $k'$ and bearing on a roller $l$, mounted on the other arm of the bent lever $i$. A light tension-spring $m$ serves to prevent or limit the oscillation of the bent lever $i$ about its axis when the roller $l$ is not in contact with the lever $k$.

By varying the position of the bent lever $i$ between the position in which it is clear of the arm $e$ and the position in which it holds the stop $i'$ in abutment with the arm $e$ at the beginning of the working stroke, so as to prevent, in conjunction with the fixed stop already referred to, all rocking motion of the block $a$, the grip or friction between the strap $g$ and the disk $h$ during the working stroke may be varied from a maximum in the former case to a minimum in the latter case, in which position the brake-strap $g$ will be held clear of the disk $h$ throughout the whole range of motion of the block $a$, and the shaft $c$ will therefore remain stationary. As the lever $k$ is raised the range of motion of the rocking block between the fixed stop and the stop $i$ is increased continuously until the lever $k$ is raised so far as to free the stop $i$ throughout the entire range of movement of the arm $e$.

Any other suitable means may be adopted for bringing the adjustable stop into such a position as will enable it to coöperate with the fixed stop in the manner described, and similar provision may be made for interposing another adjustable stop on the other side of the fixed stop, so that the driven shaft may be brought to rest from rotational motion in either direction, or the fixed stop may be dispensed with altogether and the two adjustable stops so connected and arranged as to prevent motion of the driven shaft in either or both directions.

Having thus described the nature of our said invention and the best means we know of carrying the same into practical effect, we claim—

In driving and reversing mechanism such as herein described, a disk keyed on the shaft to be driven, a strap encircling the said disk, arms loosely mounted on the said shaft, a rocking block journaled in the said arms, the ends of the said strap being pivotally connected with the said rocking block on opposite sides of its axis, means for oscillating the said rocking block about the shaft-axis, and means for limiting the range of rocking movement of the block about its journal-axis substantially as described.

In testimony whereof we have signed our names to this specification in the presence of two subscribing witnesses.

WILLIAM MEISCHKE-SMITH.
GEORGIUS FRANCISCUS MEISCHKE-SMITH.

Witnesses to the signature of William Meischke-Smith:
M. NAVARRE,
H. TANET.

Witnesses to the signature of Georgius Franciscus Meischke-Smith:
HANSON C. COXE,
JOHN BAKER.